(12) United States Patent
Ramalho

(10) Patent No.: US 7,633,879 B2
(45) Date of Patent: *Dec. 15, 2009

(54) METHOD AND APPARATUS FOR DISCOVERING THE INCOMING MEDIA PATH FOR AN INTERNET PROTOCOL MEDIA SESSION

(75) Inventor: Michael A. Ramalho, Sarasota, FL (US)

(73) Assignee: Cisco Technology, Inc., San Jose, CA (US)

( * ) Notice: Subject to any disclaimer, the term of this patent is extended or adjusted under 35 U.S.C. 154(b) by 704 days.

This patent is subject to a terminal disclaimer.

(21) Appl. No.: 11/012,017

(22) Filed: Dec. 13, 2004

(65) Prior Publication Data
US 2006/0126528 A1 Jun. 15, 2006

(51) Int. Cl.
H04L 12/16 (2006.01)
(52) U.S. Cl. .................... 370/252; 379/32.05
(58) Field of Classification Search ............... 370/331, 370/216, 256, 392, 386, 349, 352, 351, 238, 370/242; 709/223, 231
See application file for complete search history.

(56) References Cited

U.S. PATENT DOCUMENTS

| | | | | |
|---|---|---|---|---|
| 6,507,562 B1* | 1/2003 | Kadansky et al. | ............ | 370/216 |
| 6,611,502 B1* | 8/2003 | Seaman | ............ | 370/256 |
| 6,658,000 B1* | 12/2003 | Raciborski et al. | ............ | 370/386 |
| 6,671,722 B1* | 12/2003 | Stachura et al. | ............ | 709/224 |
| 6,741,600 B1* | 5/2004 | Weiss et al. | ............ | 370/404 |
| 6,760,309 B1* | 7/2004 | Rochberger et al. | ............ | 370/235 |
| 6,801,496 B1* | 10/2004 | Saleh et al. | ............ | 370/221 |
| 7,062,689 B2* | 6/2006 | Slobodnik | ............ | 714/718 |
| 7,139,242 B2* | 11/2006 | Bays | ............ | 370/238 |
| 7,154,855 B2* | 12/2006 | Hardy | ............ | 370/241 |
| 7,206,385 B2* | 4/2007 | Ethier et al. | ............ | 379/32.05 |
| 7,248,682 B1* | 7/2007 | Oran | ............ | 370/395.52 |
| 7,269,157 B2* | 9/2007 | Klinker et al. | ............ | 370/351 |
| 7,286,467 B1* | 10/2007 | Sylvain | ............ | 370/216 |
| 7,305,464 B2* | 12/2007 | Phillipi et al. | ............ | 709/223 |
| 7,454,494 B1* | 11/2008 | Hedayat et al. | ............ | 709/224 |
| 7,496,044 B1* | 2/2009 | Wing | ............ | 370/242 |

(Continued)

OTHER PUBLICATIONS

R. Braden; Network Working Group; *Requirements for Internet Hosts—Communication Layers*; Oct. 1989, pp. 1-115.

(Continued)

*Primary Examiner*—Thong H Vu
(74) *Attorney, Agent, or Firm*—Marger Johnson & McCollom, P.C.

(57) ABSTRACT

A system and technique for analyzing incoming packets. The path taken by incoming packets can be analyzed from a near end without having access to the far end. This can be done even though packets sent to the far end from the near end, take a different path than that used by the incoming packets. The process is started by an RTP no op packet sent from the near end to the far end. The no op packet request the far end to initiate a trace using a series of media packets that have sequential values in the TTL field. The results of the trace are either send from the far end to the near end and a report is complied at the near end, or the results of the trace are compiled into a report at the far end and the report is sent to the near end.

22 Claims, 5 Drawing Sheets

U.S. PATENT DOCUMENTS

| | | | |
|---|---|---|---|
| 2002/0064273 A1* | 5/2002 | Tomikawa et al. | 379/221.02 |
| 2002/0075895 A1* | 6/2002 | Yamaguchi et al. | 370/465 |
| 2002/0141392 A1* | 10/2002 | Tezuka et al. | 370/352 |
| 2002/0194361 A1* | 12/2002 | Itoh et al. | 709/233 |
| 2003/0023710 A1* | 1/2003 | Corlett et al. | 709/223 |
| 2003/0026241 A1* | 2/2003 | Ono et al. | 370/349 |
| 2003/0086425 A1* | 5/2003 | Bearden et al. | 370/392 |
| 2003/0117959 A1* | 6/2003 | Taranov | 370/241 |
| 2004/0073641 A1* | 4/2004 | Minhazuddin et al. | 709/223 |
| 2004/0252694 A1* | 12/2004 | Adhikari et al. | 370/395.2 |
| 2004/0264433 A1* | 12/2004 | Melpignano | 370/349 |
| 2005/0220035 A1* | 10/2005 | Ling et al. | 370/252 |
| 2005/0232227 A1* | 10/2005 | Jorgenson et al. | 370/351 |
| 2005/0243733 A1* | 11/2005 | Crawford et al. | 370/252 |
| 2005/0276276 A1* | 12/2005 | Davis | 370/447 |
| 2006/0002366 A1* | 1/2006 | Kawaguchi et al. | 370/349 |
| 2006/0010243 A1* | 1/2006 | DuRee | 709/230 |
| 2006/0031510 A1* | 2/2006 | Beck et al. | 709/226 |
| 2006/0059411 A1* | 3/2006 | Dacosta | 714/794 |
| 2006/0182034 A1* | 8/2006 | Klinker et al. | 370/238 |

OTHER PUBLICATIONS

Information Sciences Institute, University of Southern California; *Internet Protocol DARPA Internet Program Protocol Specification*; Sep. 1981; pp. 1-49.

Information Sciences Institute, University of Southern California; *Transmission Control Protocol, DARPA Internet Program Protocol Specification*; Sep. 1981; pp. 1-88.

* cited by examiner

METHOD AND APPARATUS FOR DISCOVERING THE INCOMING MEDIA PATH FOR AN INTERNET PROTOCOL MEDIA SESSION

RELATED APPLICATIONS

The present application is related to the following two co-pending applications which are assigned to the assignee of the present invention:
1) U.S. patent application Ser. No. 10/723,118, filed Nov. 26, 2003, entitled: "Method and Apparatus For Analyzing a Media Path in a Packet Switched Network" (referred to herein as the first referenced application).
2) U.S. patent application Ser. No. 10/797,689 filed Mar. 9, 2004 entitled: "Method And Apparatus For Analyzing A Media Path For An Internet Protocol (IP) Media Session" (referred to herein as the second referenced application).

The entire content of the two co-pending applications listed is hereby incorporated herein by reference.

FIELD OF THE INVENTION

The present invention relates to communication networks that utilize the Internet Protocol (that is, IP networks) and more particularly to conducting measurements on such networks.

BACKGROUND

In many situations it is desirable and/or necessary to analyze the network path through which packets travel from a sending point to a receiving point in the network. For example, when telephone conversation is transmitted over an IP network using Voice over IP protocol (VOIP) the jitter and delay introduced by the network affect the quality of the conversation as perceived by the users.

The following discussion will use the terms "near end" and "far end". As the terms are used herein, the "near end" is the network end point from which action is being initiated. The far end is the network end point that transmits packets to the near. The near end may be an endpoint at which a technician is located. However, a near end may also be an end point that a technician can control from a remote location, or an near end may be a network end point at which an action is automatically initiated.

Various methods are described in the prior art for analyzing the path between the end points of a network. Three such prior art techniques are described below.

A method in which "No-op" packets are used to analyze a media path in a packet switched network is described in the first co-pending application referenced above. The no-op packets are Real Time Protocol (RTP) payload packets that contain no media content. A Real Time Control Protocol (RTCP) report is generated for the received RTP no-op packets. A marker bit is set in one or more of the no-op packets that triggers the no-op packet receiver to send back the RTCP report. The operation of the media path is determined by examining the statistics in the RTCP report. For ease of reference, hereinafter the technique described in the first co-pending application listed above will be referred to as the "no-op technique"

Another technique that can be used to identify problems in Internet Protocol (IP) networks is what is known as User Datagram Protocol (UDP) traceroute. The UDP traceroute makes special use of the IP Time To Live (TTL) field which is a part of IP packets. With this technique the TTL value in the traceroute packet can be varied to isolate a trouble spot in the IP network. One problem with the UDP traceroute technique is that it is not effective in detecting network problems for IP media streams. This is because the UDP traceroute packets do not necessarily travel along the media path used by the IP media stream.

Still another technique that can be used to analyze a path in a network is described in the second co-pending patent application referenced above. With the method described in the second co-pending application listed above, media packets are sent with modified Time To Live (TTL) values to intentionally cause rejection of the media packets at intermediate nodes in a media path. Rejection notices caused by the TTL modified media packets are then analyzed to isolate Quality of Service (QoS) problems in the media path. For convenience of reference, the technique described in the second co-pending application listed above will be referred to as the "variable TTL technique".

From the viewpoint of a particular network end point, a network has a "near end" and a "far end". As used herein the terms "near" and "far" do not necessarily refer to physical distance.

The present invention is directed to technique for analyzing the path used by incoming packets at a near end of a network. It is noted that using the no-op technique described in the first co-pending application listed above, involves sending packets from one location to a second location to analyze a path. Thus, from the point of view of a technician trying to analyze the path used by incoming packets, the no-op technique requires that packets be sent from the far end of the network. In some situations a technician may not have access to the far end of a network.

SUMMARY OF THE INVENTION

The present invention provides a system and technique whereby the path taken by incoming packets can be analyzed. That is, the path taken by incoming packets can be analyzed from the near end of a network path without having access to the far end of the network path. This can be done even though packets sent from the near end to the far end may take a different path than that used by the incoming packets.

With the system and method of the present invention, a Real Time Protocol (RTP) no op packet is used to send a request from the near end to the far end. The request instructs the far end to initiate a trace using a series of TTL media packets that have sequential values in their Time of Life (TL) field. When a traceroute packet has a high enough TL value, such that the packet reaches the near end, the near end knows that the trace route process is complete. At this point the near end may signal the far end that it need not send packets with any higher value TL values. When the far end receives the ICMP "time exceeded" messages, it either sends them to the near end using RTCP packets or it "captures them" for inclusion in a traceroute formatted report back to the near end.

DETAILED DESCRIPTION

The preferred embodiment provides a method that can be employed from the near end of a network to analyze the path taken by in-coming Voice Over IP (VOIP) packets. While the specific embodiment described below relates to VoIP packets, the same method can be employed for any type of RTP media.

VoIP is just one specific example of how the method can be employed. It is also noted that as explained above, the "near end" is the end point of a network from which action is being initiated. The "far end" is the end point that transmits packets to the near. With respect to analyzing the path of VoIP packets, in the following discussion the end point at which the VoIP packets arrive is the "near end" of the network. The location where the VoIP packets originate is the "far end".

The preferred embodiment described herein utilizes media no-op packets such as those described in the first referenced co-pending application, filed Nov. 26, 2003. The preferred embodiment described herein also utilizes media packets with modified Time To Live (TTL) values such as those described in the second reference co-pending application filed Mar. 9, 2004.

It is important to note that in a VoIP network, the outgoing packets may travel over a different route than the route taken by the incoming packets. In fact, in many VoIP situations the incoming and outgoing packets travel over different routes. However, it is noted that there may be some situations where the incoming and outgoing packets do travel over the same route. The embodiment described herein can be used to analyze the path used by incoming packets whether or not the path taken by the incoming packets is the same or different than the path taken by outgoing packets.

Figure 1:
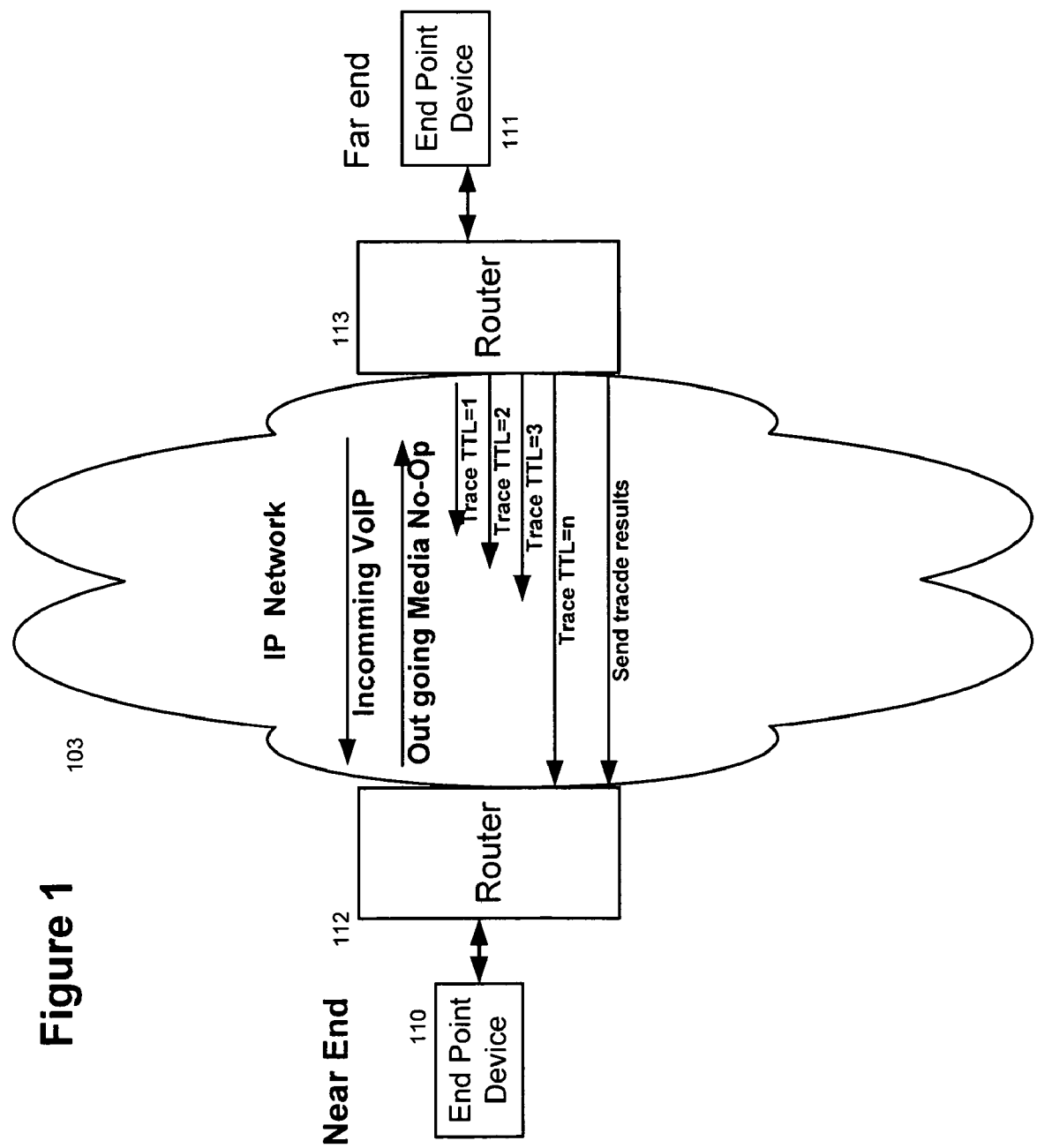
FIG. 1 is an overall system diagram.

An overall system diagram of the first preferred embodiment is shown in FIG. 1. The system connects a near end device 110 to a far end device 111. Near end device 110 is connected to network router 112 which is in turn connected to the network 103. Far end device 111 is connected to network router 113 which is in turn connected to the network 103. The network 103 may be a wide area network (WAN) such as for example the Internet. It is noted that there may be non router elements (such as layer 2 switches) between 110 and 112 or 113 and 111.

For convenience of illustration, the drawing shows only one near end device and one far end device. It should be understood that in general systems are larger than that shown in FIG. 1 and in general systems have many end devices. FIG. 1 shows only one near end and one far end device for reasons of simplicity and ease of illustration; however, it should be understood that there may be many such devices in any particular system.

It should also be understood that the terms near end and far end are relative terms. With respect to the description of the embodiments described herein, the terms "near end" and "far end" have the following meaning: The "near end" is the network end point from which action is being initiated. The far end is the network end point that transmits packets to the near. The near end may be an endpoint at which a technician is located. However, a near end may also be an end point that a technician can control from a remote location, or an near end may be a network end point at which an action is automatically initiated.

Figure 2A:
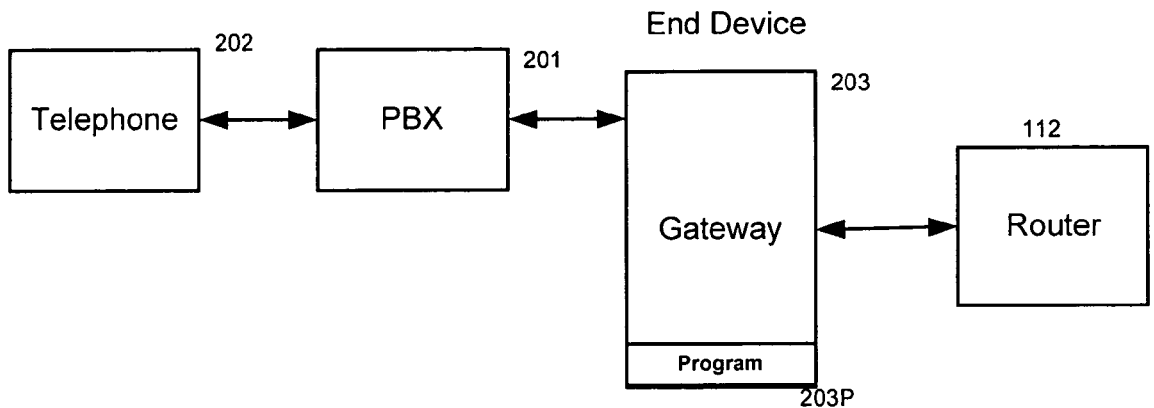
FIGS. 2A, 2B and 2C are illustration of network end points.
Figure 2B:
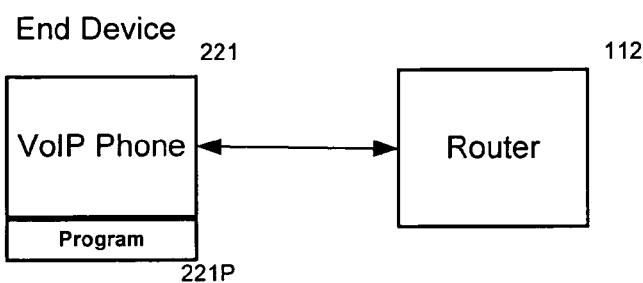
Figure 2C:
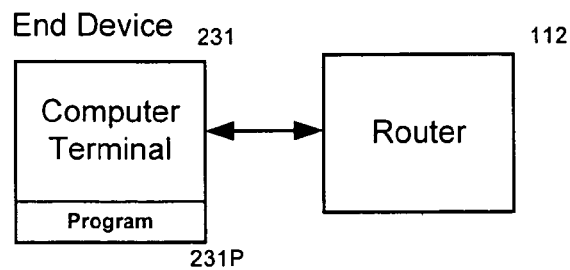

The near end device 110 and the far end device 111 may take many different forms. FIGS. 2A, 2B and 2C show different alternate embodiments of near and far end devices.

FIG. 2A shows a telephone 202 connected to a PBX 201 which is connected to a gateway 203. Gateway 203 is in turn connected to router 112. Such an arrangement is typical in a VoIP network. Gateway 203 includes a program 203P and a processor which perform the operations which will be described in detail later. The near end device in the example shown in FIG. 2A is the gateway 203 with its associated program 203P.

FIG. 2B illustrates a near end which consists of a VoIP phone 221 connected to a router 112. VoIP phone 221 has a program 221P and it typically also has microprocessor (which is not shown in the drawing) which performs the operations which will be described in detail later. The near end device in the example shown in FIG. 2B is the VoIP phone 221 and the associated program 221P.

FIG. 2C shows a computer terminal 231 connected to router 112. Terminal 231 has a program 231P which performs the operations which will be described in detail later. The near end device in the example shown in FIG. 2C is the computer terminal 231 and its associated program 231P.

FIG. 2A to 2C depict typical near end devices configurations in a VoIP network, but other configurations are possible. Any end point that sources and sinks RTP packets can be considered to be a near or far end point. The network end devices shown in FIGS. 2A to 2C are connected to near end router 112. It should be understood that similar network end devices could be connected to far end router 113 and there can be a similar variety of devices at the far end.

FIG. 1 includes an arrow designated "Incoming VoIP packets". It is the path taken by these incoming packets that the operator at near end 110 wishes to analyze.

The variable TTL technique described in the second co-pending application filed Mar. 9, 2004 utilizes media packets with modified Time To Live (TTL) values to analyze the path taken by IP packets. FIG. 1 shows arrows marked Trace TTL=1, trace TTL=2, etc. to illustrate the trace packets sent from the far end to analyze a path through the IP network 103. The arrow labeled trace TTL=n represents a packet with a TTL value that is high enough that the packet reaches the opposite end of the path. At this point the process can stop and a report can be generated.

It is important to note, that from the point of view of an operator located at the near end, the variable TTL technique as shown in the referenced co-pending application involves sending the packets with the modified TTL values from the far end. In the example described herein, with reference to FIG. 1, it is assumed that the operator is requesting measurements with respect to the packets incoming to the near end 110. As will be described, with the present invention, the operator can obtain these measurements without having access to the far end 111 of the network path.

The no-op technique described in the first reference co-pending application filed Nov. 26, 2003, involves using no-op media packets to analyze a media path in a packet switched network. The no-op packets are Real Time Protocol (RTP) payload packets that contain no media content. A Real Time Control Protocol (RTCP) report is generated for the received RTP no-op packets. With the no-op technique described in the referenced application an operator at the near end could invoke the method described to analyze the path taken by outgoing packets traveling from the near end to the far end.

The present embodiment is directed to a technique whereby an operator at the near end (or one who has remote control of the near end) can analyze the path taken by incoming packets. Such a technique is needed because, in many situations, an operator at the near end may not have access to the end point device or gateway at the far end. For example, the far end gateway may be owned and operated by a different company.

The present invention utilizes and combines the techniques described in both of the co-pending patent applications referenced above. With the embodiment described herein, the operator at the near end sends a no-op media packet to the end point device gateway at the far end. This packet has no payload, however, it is coded to tell the codec at the far end device, that a trace operation should be initiated in accordance with the variable TTL technique described in the referenced co-pending application. When the trace operation is completed, a report is sent from the far end to the near end. In an alternate embodiment, the rejection notices themselves are sent from the far end to the near end.

Thus, utilizing the technique described here, the operator who has control of near end device 110, is able to analyze the path of incoming packets. In a VoIP situation, the operator can, for example, determine the path used by the media packets received at the near end device.

In general the operation of the system proceeds as follows:
1) At session set-up, the near-end negotiates a "far-end traceroute" no-op process with the far-end. As described in the first referenced application the "no-op codec" functionality is assumed to be present at the RTP endpoints and that they can process the RTP no-op packets (that is, RTP packets that contain no media). If the far end does not have the necessary capability, the negotiating session terminates with an indication that the process can not proceed.
2) Assuming that a (regular) media session has been negotiated, the media session begins with the (usually) bidirectional flow of RTP packets.
3) Then a "far-end traceroute" is requested by some "triggering event" (a technician, a diagnostic system, the RTP endpoint itself, etc.) at the near-end. The near-end sends a "far-end traceroute" request to the far-end.
4) The far-end initiates the far-end traceroute. Depending on whether the far-end or near-end tabulates the far-end traceroute results table, either of the two flow diagrams is employed.
5) The end result of the "far-end traceroute" is a listing of the IP addresses reached by each TTL value attempted. If a particular TTL value failed to generate an ICMP TIME EXCEEDED message response, the table will list "unknown" as the IP address associated to that particular TTL.

Figure 4:
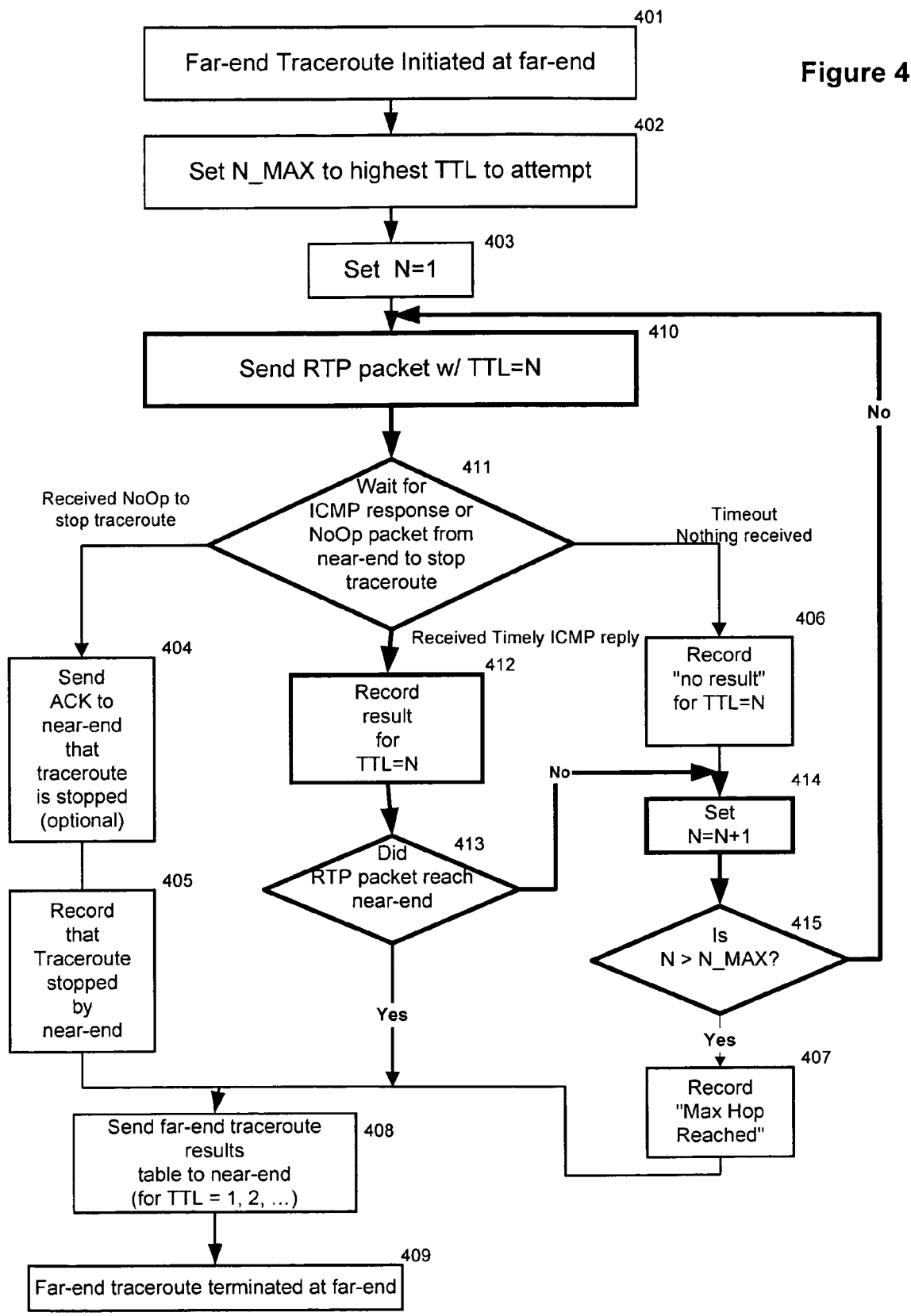
FIG. 4 is a detailed flow diagram showing the operation of the system with far end generated reports.
Figure 5:
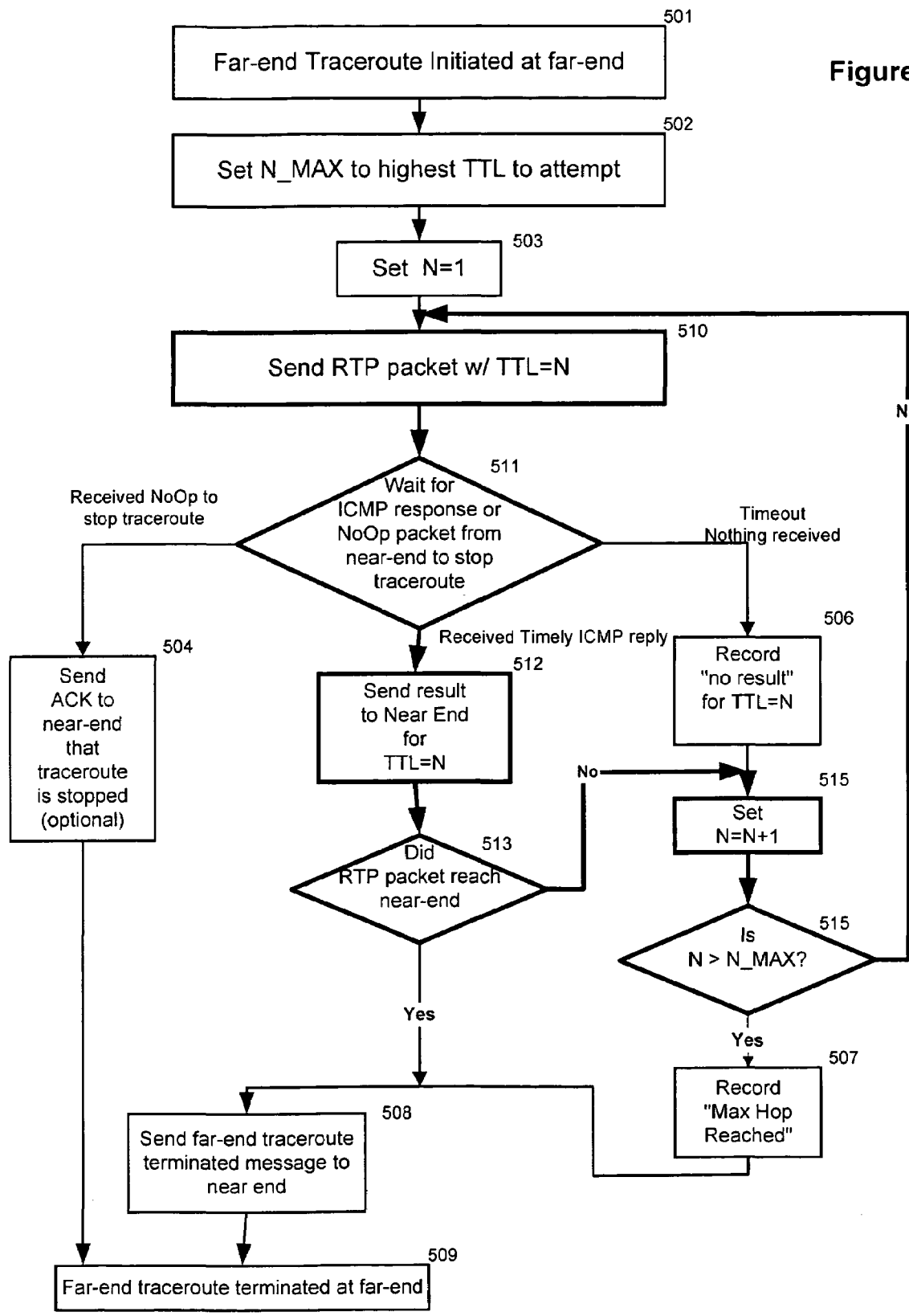
FIG. 5 is a detailed flow diagram showing the operation of the system with near end generated reports

The operations described above are performed by programmed microprocessors in the near end and far end devices. The programs That cause these operations to occur are show as programs 203P, 221P and 231P in FIGS. 2A, 2B and 2C. The microprocessors in the near end and far end devices are not explicitly shown in the figures. The operations shown in FIGS. 3, 4 and 5 are carried out by the programs and microprocessors together with the other normal components of near end and far end devices.

Figure 3:
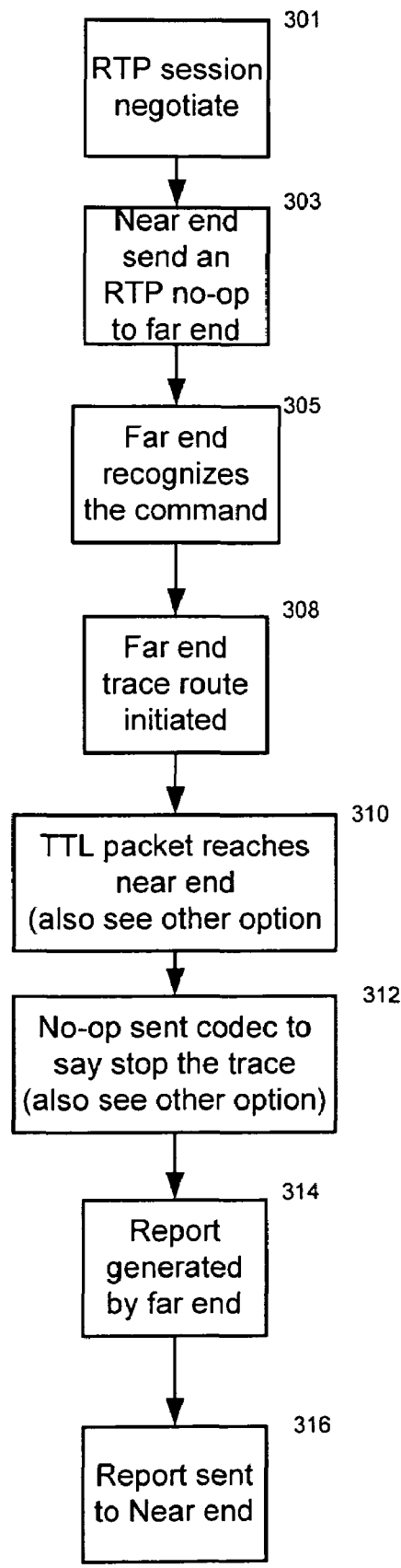
FIG. 3 is a general flow diagram showing the operation of the system

FIG. 3 is a block flow diagram illustrating the operation of the system shown in FIG. 1. The process is initiated at the near end. The near end starts the process by initiating a normal RTP session with a negotiation to determine if the far end device has the capability of performing the necessary operations. That is the far end device must have the required capabilities. The far end device may, for example, be a relatively old device that does not have the required capabilities. In such a case the process fails.

The operations shown in FIG. 3 (and in FIGS. 4 and 5) occur if the far end device has the appropriate capabilities. That is if the far end devices has a capability such as that provided by programs 203P, 221P or 231P shown in FIGS. 2A, 2B and 2C.

Thus, the process begin with a negotiation to determine if the far end has the necessary capabilities. If the far end has the necessary capability a session is negotiated as indicated by block 301. Once a session has been negotiated, the far end is prepared to execute a far end trace route in response to an RTP no op request. Next, a far end trace route is requested by sending an RTP no-op packet to the far end as indicated by block 303. This no-op packet is similar to the no-op RTP packet described in the first co-pending application referenced above.

The far end is designed to recognize this no-op packet as indicated by block 305. The far end 113 then initiates a trace operation using a series of TTL packets as indicated by block 308. This is similar to the operation described in the second co-pending application referenced above.

When the far end receives ICMP "time exceeded" messages, from the TTL packets that it sent, these messages are either compiled into a report at the far end or they sent to the near end where they are compiled into a report.

As indicated by block 310, at some later point in time, either one of two things can happen. The most likely event is that one of the TTL packets will reach the near end and be noted by the near end device. A no-op packet is then sent to the to the far end indicating that the trace operation can be terminated. This is indicated by block 312. Alternately a time out or some other action may occur to stop the trace operation.

Next a report is generated at the far end and as indicated by block 314. The report is sent to the near end as indicated by block 316.

A more detailed block diagram of the operations that occur is given in FIGS. 4 and 5. FIG. 4 shows an embodiment where a report is generated at the far end. In this embodiment, when the trace operation is finished a report is generated at the far end and the report is transmitted to the near end. A different embodiment is shown in FIG. 5. In the embodiment shown in FIG. 5, the raw data is sent from the far end to the near end, and the report is generated at the near end.

As indicated in both FIGS. 4 and 5, the operation begins when the near end asks the far end to initiate a trace operation. As indicated by blocks 402 and 403 in FIG. 4 and by blocks 502 and 503 in FIG. 5, the an N max (the largest number of trace points) is set to the highest number of traces one cares to deal with. When N max is reached the operation will stop.

At the initiation of the process N is set to 1 and the process begins. The normal flow of the process is through the boxes with a dark outline. That is, through blocks 410, 411, 412, 413, 414 and 415 in FIG. 4 and bocks 510, 511, 512, 513, 514 and 515 in FIG. 5.

When a TTL packet is sent by the far end as indicated by block 410, as indicated by block 411, the far end waits for a reply. That is, the far end waits for what is called a ICMP "time exceeded" message. Such messages are sometimes herein referred to as reply packets. If a reply packet is received in a timely manner, the process proceeds to record the result as indicated by block 412. If the packet did not reach the near end, N is incremented by 1 as indicated by block 414. If N has not reached the value of N max (see block 415), the process repeats with the higher value of N.

If a NoOp is received to stop the process blocks 404, 405 and 408 are performed to acknowledge receipt of the command (block 404), and to send the report to the near end (block 408).

Block 406 indicates that N is increased and the process continues if a time out occurs. It is noted that for a variety of reasons, a particular router in the RTP packet path might not send a response. For example, it may be too busy, or it may be programmed to not respond.

Block 408 indicates that the process is stopped and a report sent if N reaches the maximum value. Block 409 indicated that the process is terminated after the report is sent to the near end.

The embodiment illustrated in FIG. 5 is similar to the embodiment shown in FIG. 4, except that is the raw data is sent from the far end to the near end and the report is generated at the near end.

The normal operation through blocks 510. 511, 513, 515, and 515 proceeds as described with respect to the first embodiment. However, whereas bock 412 merely recorded the results, block 512 send the results to the near end.

Block 504, merely send an acknowledgement and proceeds to the termination block 509. Likewise block 509 merely sends a termination message and proceeds to block 509.

In summary, with the present invention, it is possible for the near end to imitate a trace route of incoming VoIP packets. This is possible even if the commands send from the near end to the far end travel on a route that differs from the route of the incoming packets.

It is noted that while the specific embodiment shows a system with VoIP telephones, alternate embodiments use various other types of media gateways.

It is also noted that the physical location of the technician requesting the trace route is of no particular importance. The point is that the action is taken from the near end. The initiating entity may be physically located at the near end or it may be elsewhere. Furthermore the initiating entity may be a human operator or it may be some type of automated system.

While the invention has been shown and described with respect to preferred embodiments thereof, it will be understood by those skilled in the art that various changes in form and detail can be made without departing from the spirit and scope of the invention. The scope of the invention is limited only by the appended claims.

I claim:

1. A method of analyzing the path of incoming messages from a near end device, said messages originating at a far end device, said method comprising the steps of:
   negotiating a far end traceroute no-op process with the far end device,
   sending a no-op media packet from the near end device to said far end device, said packet instructing the far end device to initiate an action,
   initiating a trace operation from the far end device utilizing a series of TTL packets with different Time To Live (TL) values the trace operation comprising:
      until a counter N reaches a predetermined value, repeatedly sending one of the TTL packets from the far end,
      if a return packet corresponding to the one of the TTL packets is received by the near end in a timely manner, recording a result, and
      if the return packet is not received by the near end in a timely manner, incrementing the counter N, and
   analyzing the return packets from said TTL packets to analyze said path, wherein the return packets comprise a listing of IP addresses reached by each of the different TL values.

2. The method of claim 1 wherein a report is compiled at the far end.

3. The method of claim 2 wherein said report is sent from the far end to the near end.

4. The method of claim 1 wherein data concerning trace packets is sent from the far end to the near end and a report is generated at the near end.

5. The method recited in claim 1 wherein said TL values are increased until a packet arrives at the near end.

6. The method recited in claim 5 further comprising terminating said series of TTL packets when said packet arrives at said near end.

7. The method recited in claim 1 wherein the near end notifies the far end when a TTL packet arrives at the near end.

8. A method of analyzing the path taken by incoming packets at a near end by the steps of:
   transmitting a command from the near end to the far end to instruct the far end to initiate a TTL trace operation,
   setting a maximum number of trace points Nmax corresponding to a variable N having an initial value of 1,
   repeatedly transmitting TTL packets with different time to live (TL) values from said far end to said near end until the variable N reaches Nmax, incrementing N after each TTL packet is transmitted,
   increasing said TL values until a TTL racket arrives at the near end, and
   gathering data on the return packets from said TTL packets to analyze said path.

9. The method of claim 8 wherein a report on said path is compiled at the far end.

10. The method of claim 9 wherein said report is sent from the far end to the near end.

11. The method of claim 8 wherein data from said return packets is sent from the far end to the near end and a report is generated at the near end.

12. The method recited in claim 8 wherein the near end notifies the far end when said TTL packet arrives at the near end.

13. The method recited in claim 12 wherein said transmission of TTL packets is terminated when said TTL packet arrives at said near end.

14. The method recited in claim 8 wherein said command is sent using a no op packet.

15. A system for analyzing the path of incoming messages from a near end device, said messages originating at a far end device, said system comprising:
   means for negotiating a far end traceroute no-op process with the far end device,
   means for sending a no-op media packet from the near end device to said far end device, said packet instructing the far end device to initiate an action,
   means for initiating a trace operation from the far end device utilizing a series of TTL packets with different Time To Live (TL) values the trace operation comprising:
      until a counter N reaches a predetermined value, repeatedly sending one of the TTL packets from the far end,
      if a return packet corresponding to the one of the TIL packets is received by the near end in a timely manner, recording a result, and
      if the return packet is not received by the near end in a timely manner, incrementing the counter N, and
   means for analyzing the return packets from said TTL packets to analyze said path, wherein the return packets comprise a listing of IP addresses reached by each of the different TL values.

16. The system of claim 15 including means for compiling a report at said far end.

17. The system of claim 16 including means for sending said report from said far end to the near end.

18. The system of claim 15 including means for sending data concerning trace packets from said far end to said near end and for generating a report at said near end.

19. The system recited in claim 15 including means for increasing the TL values until a packet arrives at said near end.

20. The system recited in claim 15 including means for notifying said far end when a TTL packet arrives at the near end.

21. A computer readable medium containing instructions which, when executed in a processing system, cause the system to analyzing the path taken by incoming packets at a near end by the steps of:

transmitting a command from the near end to the far end to instruct the far end to initiate a TTL trace operation, setting a maximum number of trace points Nmax corresponding to a variable N having an initial value of 1, repeatedly transmitting TTL packets with different time to live (TL) values from said far end to said near end until the variable N reaches Nmax, incrementing N after each TTL packet is transmitted, increasing the TL values until a packet arrives at said near end, and gathering data on the return packets from said TTL packets to analyze said path.

22. A computer readable medium containing instructions which, when executed in a processing system, cause the system to perform the steps recited in claim 21 and the step of notifying said far end when said TTL packet arrives at the near end.

\* \* \* \* \*

UNITED STATES PATENT AND TRADEMARK OFFICE
CERTIFICATE OF CORRECTION

PATENT NO. : 7,633,879 B2  Page 1 of 1
APPLICATION NO. : 11/012017
DATED : December 15, 2009
INVENTOR(S) : Michael A. Ramalho It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 909 days.

Signed and Sealed this

Twenty-first Day of December, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,633,879 B2 | Page 1 of 1 |
| APPLICATION NO. | : 11/012017 | |
| DATED | : December 15, 2009 | |
| INVENTOR(S) | : Michael A. Ramalho | |

It is certified that error appears in the above-identified patent and that said Letters Patent is hereby corrected as shown below:

Column 8, line 21, the word "racket" should read -- packet --;
Column 8, line 55, the word "TIL" should read -- TTL --.

Signed and Sealed this
Twenty-eighth Day of February, 2012

David J. Kappos
*Director of the United States Patent and Trademark Office*